United States Patent [19]

Owen et al.

[11] 4,409,899

[45] Oct. 18, 1983

[54] ACOUSTIC AMPLITUDE-DOPPLER TARGET RANGING SYSTEM

[75] Inventors: Thomas E. Owen, Helotes; Sidney A. Suhler; Wendell R. Peters, both of San Antonio, all of Tex.

[73] Assignee: The United States of America as represented by the Secretary of the Air Force, Washington, D.C.

[21] Appl. No.: 286,819

[22] Filed: Jul. 27, 1981

[51] Int. Cl.$^3$ .............................................. F42C 13/06
[52] U.S. Cl. .................................... 102/211; 102/427
[58] Field of Search ............... 102/211, 418, 419, 420, 102/427, 215

[56] References Cited

U.S. PATENT DOCUMENTS

| | | | |
|---|---|---|---|
| 2,341,351 | 2/1944 | Barkley | 102/211 |
| 2,489,255 | 11/1949 | Barker | 102/211 |
| 3,115,833 | 12/1963 | Hall et al. | 102/418 |
| 4,135,452 | 1/1979 | Kinsey et al. | 102/214 |
| 4,189,999 | 2/1980 | Anderson | 102/418 |
| 4,207,623 | 6/1980 | Anderson | 102/418 |

Primary Examiner—Charles T. Jordan
Attorney, Agent, or Firm—Donald J. Singer; Willard R. Matthews

[57] ABSTRACT

An acoustic target sensor and ranging system automatically detects military targets and provides a munition firing signal at the appropriate target position and time. An amplitude-doppler circuit is utilized to predict the time of closest approach to a munition by a target by measuring the time interval between zero crossings of the second and third derivatives of the received acoustic wave amplitude function. The circuit produces a firing signal by logically ANDing the closest point of approach signal it develops with a signal that indicates when target range is within specified limits. The circuit is realized by means of conventional electronic zero crossing detectors, an up-down counter, dividers, sample and hold devices and voltage comparators. The acoustic target signal is obtained from an omni-directional microphone the output of which is amplified and rectified.

7 Claims, 7 Drawing Figures

4,409,899

ACOUSTIC AMPLITUDE-DOPPLER TARGET RANGING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to target ranging and target activated munitions and in particular to an acoustic system that predicts the closest point of approach to a munition and the time of arrival thereat of a moving target and generates a munition fire signal in response thereto.

There currently exists a military requirement for a system that is capable of automatically detecting and classifying military targets and developing firing signals for special munitions at the appropriate target position and time. It is a specific requirement of such a system to detect ground-based targets through their seismic, acoustic and/or other characteristic emanations and to produce an electrical firing command when the target is at its closest point of approach and within the predetermined effective range of the munition. Physical constraints on the requirement dictate that the sensor must be passive and act independently from a single point. Further the concept of the system must be such that the sensor system can ultimately be reduced in size, power consumption and cost to be placed within the munition.

These constraints essentially eliminate the use of conventional radar devices because they are not passive and also because of their size, cost and complexity.

One prior art approach to providing the type of system required comprehends the concept of single site ranging by cross-correlation of seismic and acoustic signals. Such a concept depends upon or infers a knowledge of the velocity of propagation over two paths. The speed of sound in air is reasonably constant being mildly dependent on air temperature. If accuracy requirements dictate the need, air temperature could be sensed and the necessary corrections performed. However, obtaining a knowledge of the seismic velocity over short ranges and in the top soil and weathered layer is extremely difficult. The details of runway construction and other man-made changes in the natural terrain as well as naturally occurring rapid changes in soil conditions from point to point on the surface make the advance prediction of seismic velocity impractical. Systems of this type therefore have never been effectively developed.

Another approach utilizing the concept of single site ranging by an acoustic single sensor method has been developed and is described in our co-pending patent application Ser. No. 286,820, entitled *Acoustic Amplitude Threshold Target Ranging System*, filed on even date herewith. Although this system generally satisfies the above stated requirements it lacks the precision necessary for some applications.

Accordingly, there currently exists the need for a target ranging system for munition activation that is passive and acts independently from a single point and that is small, inexpensive and low in power consumption. It is also required that such a system have a precise target location predictive capability. The present invention is directed toward satisfying that need.

SUMMARY OF THE INVENTION

The acoustic target sensor and ranging system of the invention is based on the recognition of the fact that there exists special relationships between the acoustic signal amplitude function and its derivatives. That is, the ratio of the time interval between the zero crossings of the third and second derivatives is constant with respect to the time interval between the second and first derivative zero crossings for all target velocities and path offsets. This unique relationship is utilized in the system of the invention to predict the closest point of approach of a moving target to a munition and also predict its time of arrival.

The system of the invention comprises: (1) an acoustic sensor circuit for sensing and generating an amplitude function signal in response to moving target sound waves; (2) a differentiating circuit of three cascaded differentiating operational amplifiers that develops first, second and third derivatives of the amplitude function signal; (3) a target time of arrival predicting circuit comprised of zero crossing detectors and an up-down counter that develops from the second and third derivatives of the amplitude function and a time interval ratio; a response indicating the predicted time of arrival; (4) a distance to the closest point of approach determining circuit comprising sample and hold devices, subtractors and dividers that develops a predicted distance of closest approach signal from the amplitude function signal, its first derivative and zero crossing time data; and (5) a munition fire signal circuit comprising a comparator and an AND gate that compares the predicted distance of closest point of approach signal with a fixed distance signal and logically ANDS the result with the predicted time of arrival signal to produce a munition fire signal.

It is a principal object of the invention to provide a new and improved acoustic amplitude-doppler target ranging system.

It is another object of the invention to provide an acoustic amplitude-doppler target ranging system including a munition and means for firing the munition at the time and point of closest approach of the target.

It is another object of the invention to provide an acoustic amplitude-doppler target ranging system that is passive and acts independently from a single point.

It is another object of the invention to provide an acoustic amplitude-doppler target ranging system that is small, inexpensive and low in power consumption.

It is another object of the invention to provide an acoustic amplitude-doppler target ranging system having a precise target location predictive capability.

These together with other objects, features and advantages of the invention will become more readily apparent from the following detailed description taken in conjunction with the illustrative embodiment in the accompanying drawings.

DETAILED DESCRIPTION OF THE PREFERRED EMBODIMENT

The detection and ranging function of the system of the invention is to detect passing aircraft targets that are taxiing or taking off and to provide a munition firing signal at the closest point of approach if the target is within a specified range. The concept upon which the system of the invention is based employs a single acoustic sensor and extracts the required information from the target signal amplitude and frequency content.

Figure 1:
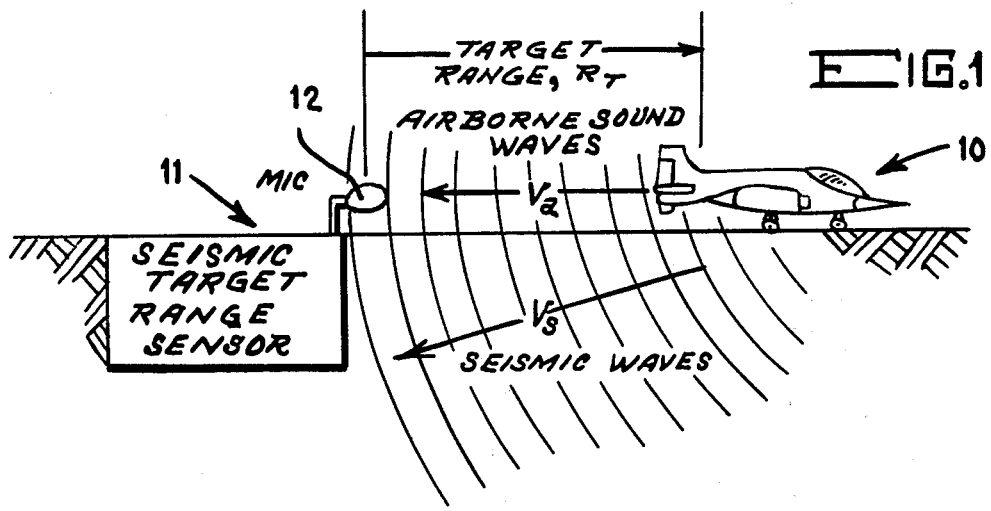
FIG. 1 is a pictorial representation of an application of the target ranging system of the invention.

FIG. 1 is a pictorial illustration of an aircraft 10 (target) and sensing system 11 in the type of relationship described.

The following constraints and assumptions are made in the development of the concept of the invention. Compromises with actual situations are not serious, and the resulting inaccuracies do not impair the viability of the concept.

(1) Taxiing aircraft targets travel at constant speed not over 25 mph and move in a straight line.

(2) Take-off aircraft targets travel at linearly increasing speed, reaching a speed of 100 mph at lift-off and move in a straight line.

(3) Sounds emanating from either taxiing or take-off targets are broadband in nature, having one or more strong spectral lines in the frequency range of 1,000–3,000 Hz.

(4) Sound radiation patterns from either taxiing or take-off targets are omnidirectional.

(5) Topographic relief, surface vegetation, and meteorological effects on sound propagation are negligible.

(6) Microphone sensor is omnidirectional.

(7) Sound propagation time delay is neglected.

In a free-field propagating situation, sounds arriving at an omnidirectional microphone from a target constrained, as above, will produce an increasing signal amplitude up to a maximum at the time of closest approach and then the amplitude will decrease thereafter. The amplitude behavior of the signal is governed uniquely by the target speed, the inverse square law of sound propagation, and the geometric factors of the target path with respect to the microphone.

It has been determined that there are special relationships between the amplitude function and its derivatives. In considering the zero-crossings of the first, second, and third derivatives of the acoustic amplitude function it has been found that for constant velocity targets, there is a constant ratio between two specific time intervals. Specifically, the ratio of the time interval between the zero crossings of the third and second derivatives is constant with respect to the time interval between the second and first derivative zero crossings for all target velocities and path offsets.

Figure 2:
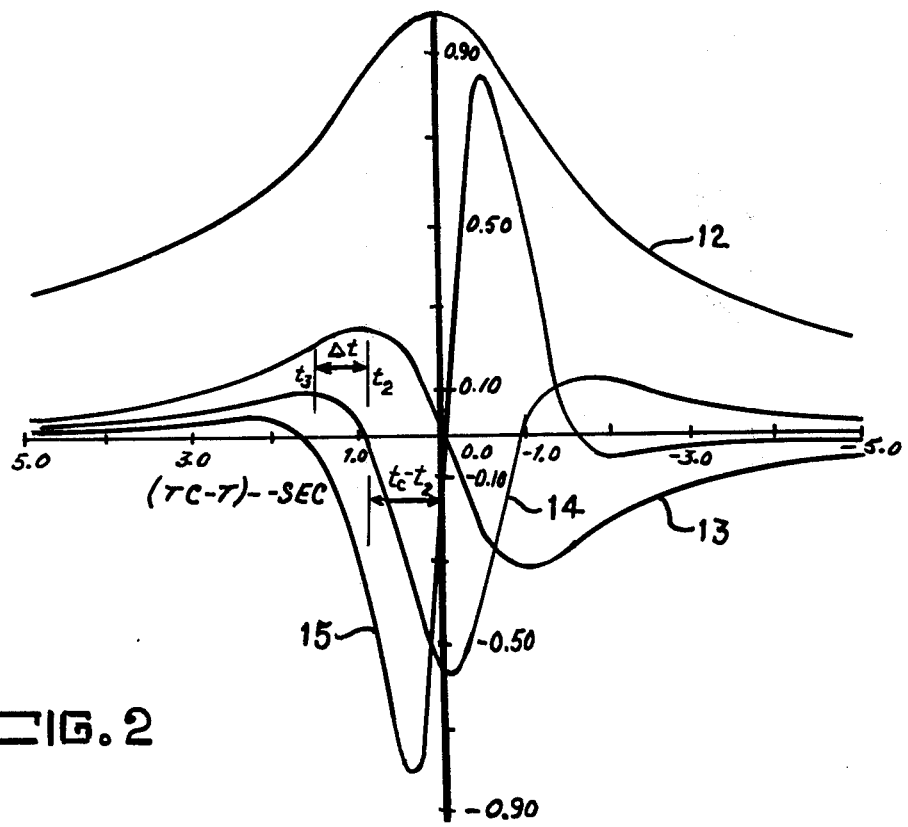
FIG. 2 is a graph of an acoustic signal amplitude function and derivaties.

These time intervals are indicated in FIG. 2 as $\Delta t$ and $t_c - t_2$, where $\Delta t = t_2 - t_3$ and $t_c$ is the time of closest approach. Referring to FIG. 2 curve 12 represents the fundamental amplitude function, curve 13 its first derivative, curve 14 its second derivative and curve 15 its third derivative. Using $\Delta t$ as a unit of time related to the target transit period, the predicted time to closest approach is $$t_c - t_2 = K\Delta t \tag{1}$$

K will be shown to be constant and independent of target velocity and offset for constant velocity targets. For constantly accelerating targets, the value K varies only over a small range for reasonable assumed take-off accelerations.

Figure 3:
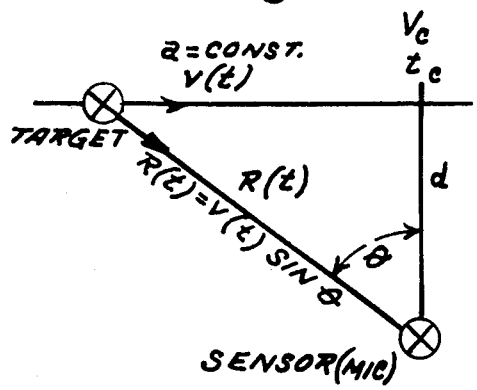
FIG. 3 is a vector diagram showing target sensing geometry.

In FIG. 3, the line-of-site range to the target is $$R(t) = \left[ d^2 + [v_c(t_c - t) - \frac{a}{2}(t_c - t)^2]^2 \right]^{1/2} \tag{2}$$

Normalizing with respect to target velocity at closest point yields $$\frac{R(t)}{v_c} = \left[ \left(\frac{d^2}{v_c}\right) + (t_c - t)^2 - \frac{a}{v_c}(t_c - t)^3 + \frac{1}{4}\left(\frac{a^2}{v_c}\right)(t_c - t)^4 \right]^{1/2} \tag{3}$$

At the microphone, the acoustic signal amplitude is given by $$f_a(t) = P(t)F_a(t) \tag{4}$$

where:

$P(t) = d_o/R(t) = $ A dimensionless geometrical amplitude function based on the inverse square sound propagation law;

$F_a(t) = $ Aircraft sound signal defined at a reference distance $d_o$, corresponding to a minimum defined distance of target closest approach to the microphone;

$R(t) = $ Line-of-sight target range.

The time derivatives of the amplitude function, P, normalized with respect to P at closest approach are $$\frac{\dot{P}(t)}{P(t_c)} = -d\left[\frac{\dot{R}}{R^2}\right] \tag{5}$$

$$\frac{\ddot{P}(t)}{P(t_c)} = \frac{d}{R^3}[2\dot{R}^2 - R\ddot{R}] \tag{6}$$

$$\frac{\dddot{P}(t)}{P(t_c)} = \frac{d}{R^4}[6\dot{R}(R\ddot{R} - \dot{R}^2) - R^2\dddot{R}] \tag{7}$$

where:

$$\dot{R}(t) = \frac{1}{2R(t)}[-2v_c^2(t_c - t) + 3av_c(t_c - t)^2 - a^2(t_c - t)^3] \tag{8}$$

$$\ddot{R}(t) = \frac{1}{2R(t)}[2v_c^2 - 6av_c(t_c - t) + 3a^2(t_c - t)^2 - 2\dot{R}^2(t)] \tag{9}$$

$$\dddot{R}(t) = \frac{3}{R(t)}[av_c - a^2(t_c - t) - \dot{R}\ddot{R}] \tag{10}$$

Two target velocity conditions are now considered: (1) constant velocity as in the taxiing aircraft case, and (2) constant accelerations as in a take-off situation. In the constant velocity case, $a = 0$, $v_c$, the velocity at closest approach, is the taxiing velocity. Substituting the resulting values for the derivatives into Equations (5), (6), and (7) yields $$\frac{P(t)}{P(t_c)} = \frac{d}{[d^2 + v_c^2(t_c - t)^2]^{1/2}} \quad (11)$$

$$\frac{\dot{P}(t)}{P(t_c)} = \frac{dv_c^2(t_c - t)}{[d^2 + v_c^2(t_c - t)^2]^{3/2}} \quad (12)$$

$$\frac{\ddot{P}(t)}{P(t_c)} = \frac{dv_c^2[2v_c^2(t_c - t)^2 - d^2]}{[d^2 + v_c^2(t_c - t)^2]^{5/2}} \quad (13)$$

$$\frac{\dddot{P}(t)}{P(t_c)} = \frac{3dv_c^4(t_c - t)[2v_c^2(t_c - t)^2 - 3d^2]}{[d^2 + v_c^2(t_c - t)^2]^{7/2}} \quad (14)$$

Setting each of the derivatives equal to zero and solving for the positive roots gives the times of the zero crossings for each of the derivatives.

$$\dot{P}(t) = 0 \text{ at } t_1 = t_c \quad (15)$$

$$\ddot{P}(t) = 0 \text{ at } t_2 = t_c - \sqrt{\frac{1}{2}} \frac{d}{v_c} \quad (16)$$

$$\dddot{P}(t) = 0 \text{ at } t_3 = t_c - \sqrt{\frac{3}{2}} \frac{d}{v_c} \quad (17)$$

Solving for the ratio of the time intervals in Equation (1) gives:

$$t_c - t_2 = K t = K(t_3 - t_2) \quad (18)$$

$$K = \frac{t_c - t_2}{t_3 - t_2}$$

which, from the zero crossings derived in Equations (16) and (17), gives $$K = \frac{1}{\sqrt{3} - 1} = 1.3660 \quad (19)$$

From this relationship, a prediction of the time of closest point approach can be made that is independent of offset distance and target velocity for constant velocity targets.

If the target is allowed to accelerate as in a take-off roll, the derivatives of the amplitude function contain acceleration terms. Solving directly for the roots of these second and third derivatives is not practical because of the high degree polynomials involved. Alternatively, numerical solutions of several typical examples are utilized. Sample calculations are made for various combinations of offset distance, d; acceleration, a; and velocity at CPA, $v_c$. The range of values for each variable are taken as:

d = 20 m; 30 m; 60 m; 90 m
a = 0 m/sec²; 3 m/sec²; 5 m/sec²
$v_c$ = 10 m/sec; 30 m/sec; 45 m/sec.

The average value obtained for the ratio, $K = (t_c - t_2)/(\Delta K)$, is 1.2912, not greatly different from the value obtained in the constant velocity case. As a general approach, the average of the two values $$K = K + K/2 = 1.3285,$$

can be used in the concept implementation.

Figure 4:
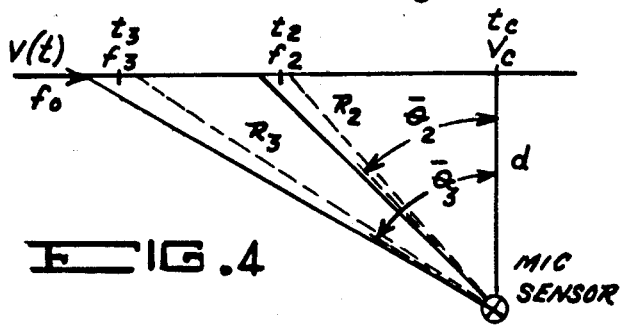
FIG. 4 is a diagram showing doppler frequency analysis geometry.

The following develops equations for the prediction of closest point of approach and employs the analysis constraint that there are strong spectral lines in the acoustic signal. FIG. 4 is a diagram of the doppler frequency analysis geometry used in this analysis.

The received frequency of one of the spectral lines, $f_o$, at times $t_3$ and $t_2$ is given by $$f_3 = f_o \left(1 + \frac{|\dot{R}_3|}{v_a}\right) ; t = t_3 \quad (20)$$

$$f_2 = f_o \left(1 + \frac{|\dot{R}_2|}{v_a}\right) ; t = t_2 \quad (21)$$

and the change in received frequency between points 3 and 2 is $$f_{32} = f_3 - f_2 = \frac{f_o}{v_a} [|\dot{R}_3| - |\dot{R}_2|] \quad (22)$$

From the ratio of the amplitude functions, $\dot{P}$ and P, $$\frac{\dot{P}(t_2)}{P(t_2)} = -\frac{\dot{R}(t_2)}{R(t_2)} ; \text{ or } |\dot{R}_2| = \frac{\dot{P}(t_2)}{P(t_2)} R_2 \quad (23)$$

and $$\frac{\dot{P}(t_3)}{P(t_3)} = -\frac{\dot{R}(t_3)}{R(t_3)} ; \text{ or } |\dot{R}_3| = \frac{\dot{P}(t_3)}{P(t_3)} R_3 \quad (24)$$

Substituting into Equation (22), the values of $\dot{R}$ from Equations (23) and (24) yields $$\Delta f_{32} = \frac{f_o}{v_a} \left[\frac{\dot{P}(t_3)}{P(t_3)} R_3 \frac{\dot{P}(t_2)}{P(t_2)}\right] R_2 \quad (25)$$

$$= \frac{f_o d}{v_a} \left[\frac{\dot{P}(t_3)}{P(t_3)} \cdot \frac{1}{\cos \theta_3} - \frac{\dot{P}(t_2)}{P(t_2)} \cdot \frac{1}{\cos \theta_2}\right] \quad (26)$$

Solving for d gives $$d = \frac{v_a \cos \theta_3 \frac{\Delta f_{32}}{f_2}}{\frac{\dot{P}(t_3)}{P(t_3)} - \frac{\cos \theta_3}{\cos \theta_2} \cdot \frac{\dot{P}(t_2)}{P(t_2)}} ; f_o = f_2 \quad (27)$$

from measurements of the doppler frequency shifts $(\Delta f_{32})/(f_2)$ and the normalized amplitude first derivative at times corresponding to the zero crossings of the third ($t_3$) and the second ($t_2$) derivatives of the amplitude function.

It has been shown above that the time of closest approach of a moving target to a munition can be predicted by measuring the time interval between the zero crossings of the second and third derivatives of the amplitude function (P). An average value of $K = (t_c - t_2)/(t_2 - t_3) = 1.328$ has been derived from computations and simultations.

Figure 5:
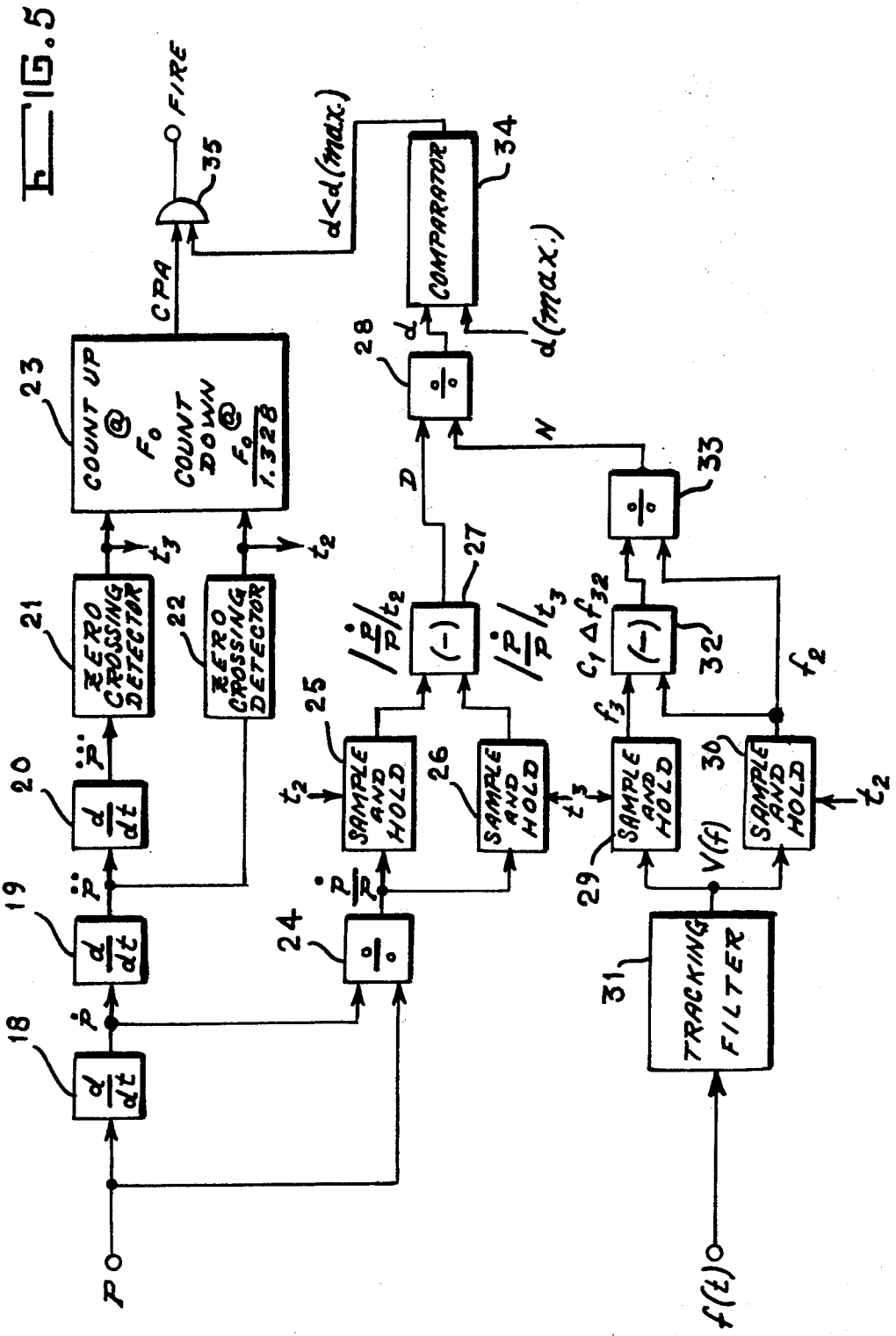
FIG. 5 is a simplified block diagram of one embodiment of the invention.

The implementation of this prediction is straightforward as indicated in FIG. 5. Referring now to FIG. 5 the system of the invention is implemented by: a differentiating circuit comprising differentiating operational amplifiers 18, 19, 20; a time of arrival determining circuit comprising zero crossing detectors 21, 22 and up-down counter 23; a distance to closest approach determining circuit comprising filter 31, dividers 24, 28, 33, sample and hold devices 25, 26, 29, 30 and subtractor devices 27, 32; and, a munition fire signal circuit comprising comparator 34 and AND gate 35.

In operation amplitude function signal P is an amplified rectified, and smoothed acoustic signal. Three differentiations in cascade produce $\dot{P}$, $\ddot{P}$ and $\dddot{P}$. The instant of zero crossing of $\ddot{P}$ and $\dddot{P}$ indicate the times $t_2$ and $t_3$, respectively. Electronic counter 23 counts up from zero starting at $t_3$ at a frequency $F_o$. At time $t_2$, the counter register indicates the time interval $t_2 - t_3$. If the clock frequency is changed to $F_o/1.328$ and the counter mode changed to count down at time $t_2$, it will reach zero in a time interval $t_c - t_2 = 1.328(t_2 - t_3)$ or precisely at the predicted time of closest point of arrival (CPA).

To produce a firing signal, the CPA signal is logically "ANDed" by AND gate 35 with a signal indicating that target range is within specified limits. Equation (27) indicates that the target range, d, at CPA can be estimated at time instant $t_2$. The implementation of that function ratio is shown in FIG. 5. The velocity of sound in air is assumed constant, and the cosines of the relative bearing angles of the target at $t_2$ and $t_3$ are approximately the same for most practical speeds and ranges. Equation (27) reduces to:

$$d = \frac{C_1 \frac{\Delta f_{32}}{f_2}}{\left| \frac{\dot{P}}{P_{t2}} \right| - C_2 \left| \frac{\dot{P}}{P_{t3}} \right|} = \frac{N}{D} \qquad (28)$$

The numerator (N) of Equation (28) is obtained by sampling and holding a voltage proportional to the frequency of the acoustic signal being tracked at times $t_2$ and $t_3$. The scaled difference of the value is $C_1 \Delta f_{32}$. Division by $f_2$ yields $C_1 (\Delta f_{32})/(f_2)$. The denominator (D) is obtained by smapling the ratio of $(\dot{P})/(P)$ at times $t_2$ and $t_3$. The properly scaled difference of those two values yield $$\left| \frac{\dot{P}}{P_{t2}} \right| - C_2 \left| \frac{\dot{P}}{P_{t3}} \right|.$$

The indicated division (N/D) yields d which is the desired estimate of range at CPA. This estimate is compared with the maximum allowed range ($d_{max}$). If the prediction indicates the target will be in range, the output gate is opened and a fire signal is produced at CPA.

Figure 6:
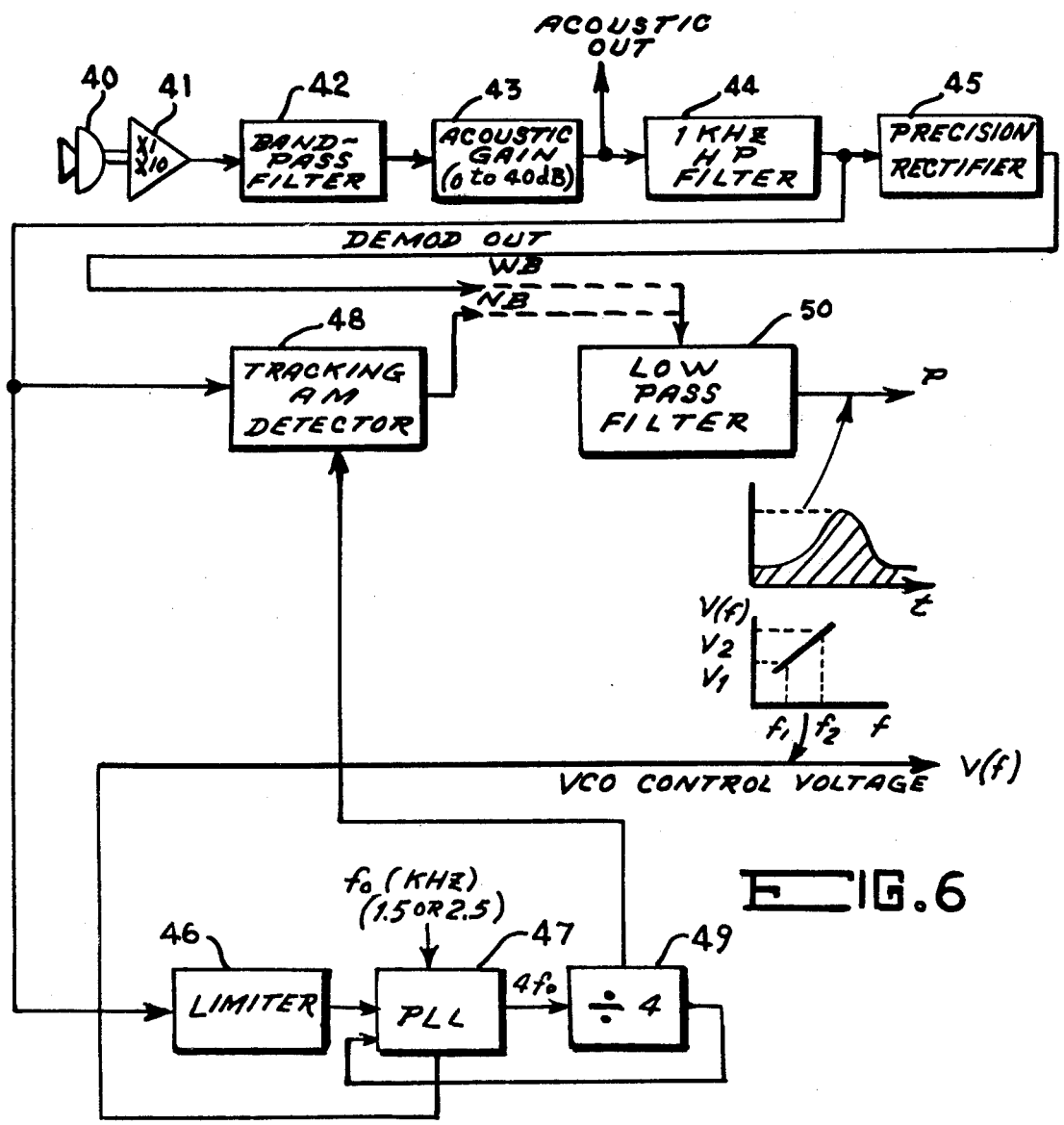
FIG. 6 is a block diagram of the preamplifier and signal conditioning circuits of the invention.

FIG. 6 shows the signal conditioning sections of the system. It comprises microphone 40, preamplifier 41, bandpass filter 42, acoustic gain stage 43, high pass filter 44, rectifier 45, limiter 46, phase locked loop circuit 47, tracking AM detector 48, divider 49, and low pass filter 50. By way of example, microphone 40 can be a 1-inch-diameter ceramic microphone (GenRad Model 1560-2131) which is connected to a variable gain preamplifier 41 (GenRad Model 1560-P40), and the two together constitute the transducer element used to sense the acoustic target signal.

A ceramic microphone is preferably used because of its ruggedness, stability, and reliability. Its relatively low impedance results in low preamplifier noise, high sensitivity, and it operates well under conditions of high humidity.

The microphone can be mounted vertically to give a grazing-incidence response to the acoustic signals from the aircraft. For this configuration, the direction of sound propagation is parallel to the plane of the microphone diaphragm. Thus, the sound wave can approach the microphone from any side giving a uniform omnidirectional response in the horizontal direction.

The microphone can also be fitted with a commercial windscreen to reduce the effects of ambient wind noise. Wind turbulence at the surface of the microphone diaphragm generates low-frequency noise, which can lead to erroneous measurements. The windscreen also protects the microphone from accumulations of vapor and dust. The effect of the windscreen on the frequencies of interest is almost negligible. The screen does attenuate the higher frequencies, however, with a loss of about 1 dB a 8 kHz and increasing at higher frequencies. The wideband signal from the microphone preamplifier is band-limited by external variable bandpass filter 42 and the output of the bandpass filter is coupled to the input of interval variable gain amplifier 43.

A 1-kHz highpass filter 44 follows the acoustic gain amplifier 33. This filter for example can be a 4-pole Butterworth type giving a filter rolloff skirt of 24 dB per octave.

The filtered acoustic signal is coupled to the inputs of two types of amplitude demodulators. One amplitude detector with the notation "WB" (wideband) is an absolute value circuit consisting of precision fullwave rectifier 45.

The "NB" (narrowband) amplitude demodulator uses a phase-lock-loop 47 (PLL) to lock onto the dominant coherent spectral component within the capture range of the PLL. The PLL operates on zero crossings of the acoustic signal and needs a fast rise time on its input signal. The limiter 46 between the 1 kHz highpass filter 44 and the PLL input conditions the acoustic signal for proper PLL input.

The PLL has two selectable tracking range positions of 1.5 kHz and 2.5 kHz. The 1.5-kHz position has a capture range of 1 to 2 kHz and the 2.5-kHz position, a capture range of 2 to 3 kHz. The VCO in the PLL operates at a frequency which is four times the lock frequency. The VCO output is fed back to the PLL phase comparator through a divide-by-four circuit 44 which also provides the quadrature signals needed for synchronous AM demodulation. In this operation, the PLL locks onto a spectral component in the acoustic signal and produces at the divide-by-four output, a reference signal which is the same frequency as the spectral component but without amplitude modulation. This reference is multiplied (mixed) with the acoustic signal in the block 48 labeled "Tracking AM Detector."

The output of either the WB or NB signals are filtered by an external lowpass filter 50 to remove high-frequency components, leaving the demodulated envelope of the "P" acoustic signal. The low-pass filter provides an attenuation slop of 24 dB/octave.

The VCO control voltage of the PLL is filtered to give a slowly varying DC voltage "v(f)" which is proportional to the lock frequency of the PLL. This signal along with the P signal are the fundamental signals used in all of the circuits of the system of the invention.

Figure 7:
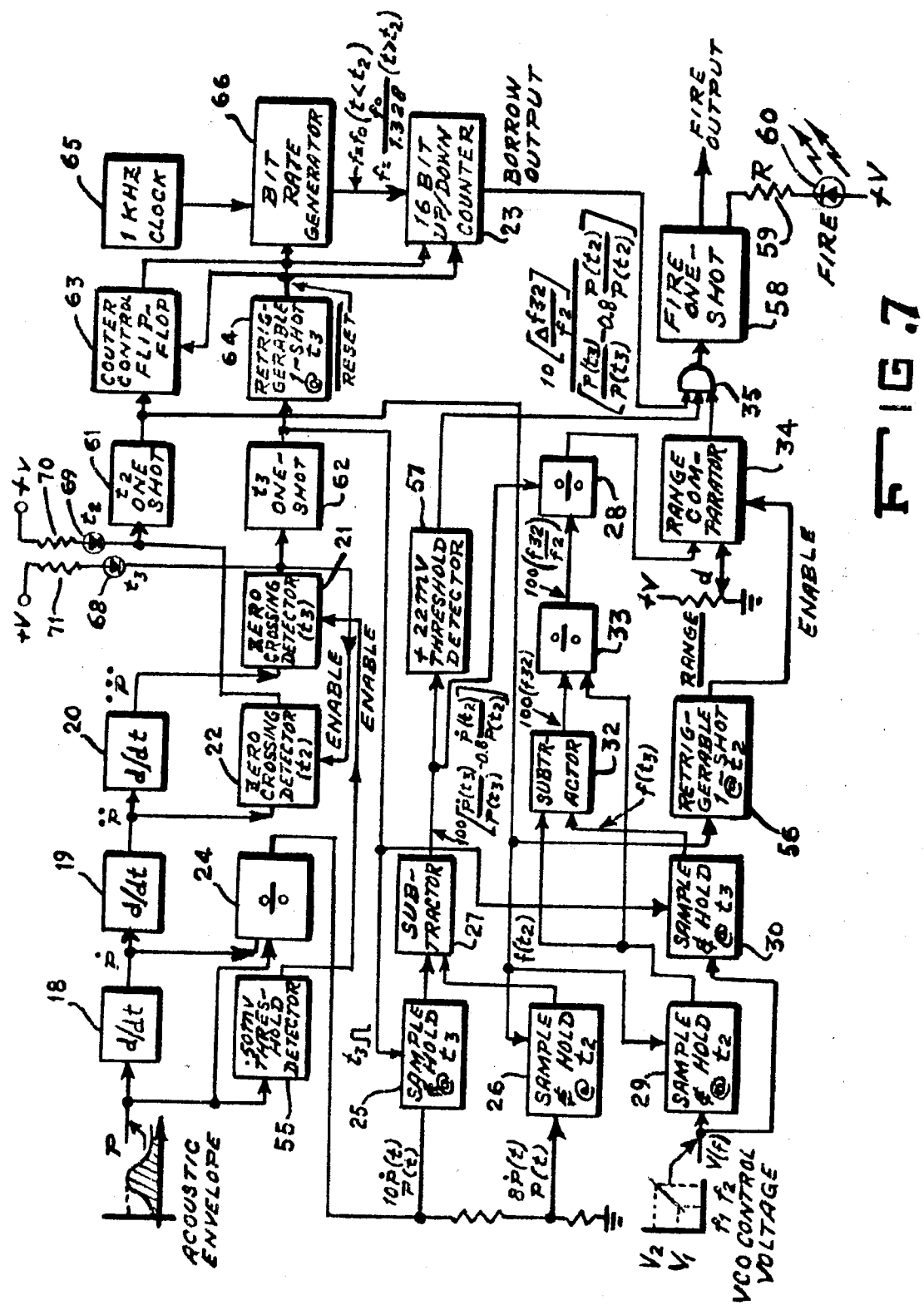
FIG. 7 is a detailed block diagram of the system of the invention.

FIG. 7 shows the detailed block diagram of the circuit used to implement the acoustic amplitude and doppler method of the invention. In addition to the components and functions shown in the simplified block diagram of FIG. 5 the expanded circuit shown in FIG. 7 includes threshold detectors 55, 57, retriggerable one shots 56, 64, fire one shots 58, resistors 59, 70, 71, diodes 60, 68, 69, one shots 61, 62, counter control flip flop 63, clock 65 and bit rate generator 66. In operation the P signal is differential three times to give signals $\dot{P}$, $\ddot{P}$ and $\dddot{P}$. The $\dot{P}$ and $\dddot{P}$ signals are inverted because of the inverting nature of the operational amplifiers used to take derivatives.

Threshold detector 55 is used to inhibit all circuits until a P signal exceeding 50 mV is detected. This is the first condition required for a munition fire signal. With a well-behaved P signal, the first zero crossing ($t_3$) occurs in the $\dddot{P}$ output. This zero crossing is detected by its zero crossing detector 21 which, in turn, triggers one shot 62. A second zero crossing detector 22 is used to detect the zero crossings of the second derivative signal. Its output is also used to trigger a one-shot coincident with $t_2$. A divider 24 is used to continuously take the ratio of $\dot{P}(t)$ to $P(t)$. At $t_3$, the corresponding one shot activates sample-and-hold circuit 25 to acquire a voltage equal to 10 $[\dot{P}(t_3)/P(t_3)]$. At $t_2$, another sample-and-hold circuit 26 samples a scaled-down version of the divider output to acquire a voltage equal to 8$[\dot{P}(t_2)/P(t_2)]$. These two values are subtracted and multiplied by ten to get the term $100[\dot{P}(t_3)/P(t_3) - 0.8\dot{P}(t_3)/P(t_3)]$. A +22 mV threshold detector 57 is used to inhibit outputs for conditions of a near-zero denominator or for negative values—both invalid values indicative of a false trigger.

The VCO control voltage is sampled at $t_2$ and $t_3$ by two additional sample-and-hold sections 29, 30 shown in the lower left-hand corner of the block diagram. These sampled values are subtracted by subtractor 32 to give 10($\Delta f_{32}$) which, in turn, is divided by $f_2$ (divider 33) to generate the term 100$[\Delta f_{32}/f_2]$. This value is divided (divider 28) by $100[\dot{P}(t_3)/P(t_3) - 0.8\dot{P}(t_2)/P(t_2)]$ to give the desired range term of:

$$\frac{10[\Delta f_{32}/f_2]}{[\dot{P}(t_3)/P(t_3) - 0.8\,\dot{P}(t_2)/P(t_2)]}$$

The range value is compared to the DC value set by the system range control, and when the calculated value is less than the set value, the range comparator 34 generates an output which satisfies the second condition needed for a munition fire signal. Retriggerable one shot 56 inhibits the range comparator until the $t_2$ condition is reached. This circuit is used to help insure against false triggers.

A third condition that must be met to generate a fire signal is the estimated time of CPA indicated by the output of a 16 bit up/down counter 23. This counter either counts up or down, as dictated by the counter control flip-flop 63. Before $t_3$, retriggerable one-shot 64 resets the flip-flop and the 16-bit counter. At $t_3$, the counter is in the up-count mode and is clocked at a 1-kHz rate as determined by the bit-rate generator 66. When $t_2$ occurs, the counter control flip-flop shifts the counter to the down-count mode and the bit-rate generator is divided by 1.328. Thus, the down counter is clocked at a frequency of 753 Hz. At zero count, a borrow pulse is generated, giving the third condition needed for a munition fire signal.

When all three conditions are satisfied for a fire signal, the munition "fire" one-shot 58 gives a short duration output to a fire output BNC connector (not shown).

While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. An acoustic amplitude-doppler system for determining the distance to the closest point of approach to a munition and the time of arrival thereat of a moving target, said acoustic amplitude-doppler system comprising an acoustic sensor circuit for sensing moving target sound waves and generating an input amplitude function signal P in response thereto, a differentiating circuit receiving said input signal and developing signals $\dot{P}$, $\ddot{P}$ and $\dddot{P}$, said developed signals representing respectively the first, second and third derivatives of said input signal, a time determining circuit receiving said second and third derivative signals $\ddot{P}$ and $\dddot{P}$ and generating from the times $t_2$, $t_3$ of the zero crossings thereof and from a time interval ratio K, a response indicating the predicted time $t_c$ of target arrival at said closest point of approach, and a distance determining circuit receiving (a) a signal having a frequency $f_o$ responsive to spectral lines in said moving target sound waves, (b) input amplitude function P and (c) first derivative signal $\dot{P}$, and developing therefrom a response indicating the predicted distance d of the closest point of approach of said target to said munition.

2. An acoustic amplitude-doppler system as defined in claim 1 including comparator means comparing the response d developed by said distance determining circuit with a preselected distance signal d (max) and providing an output in response to the conditions of d being equal to and less than d (max), and an AND gate, said AND gate receiving the response generated by said time determining circuit and the output of said comparator means and outputting a munition fire signal in response thereto.

3. An acoustic amplitude-doppler system as defined in claim 2 wherein said predicted distance d is developed from (a) the normalized amplitude of said first derivative signal $\dot{P}$ at times $t_2$ and $t_3$, (b) the frequency $f_2$ at time $t_2$, (c) the frequency $f_3$ at time $t_3$ and (d) the change in frequency $\Delta f_{32}$ between times $t_2$ and $t_3$.

4. An acoustic amplitude-doppler system as defined in claim 3 wherein said time interval ratio K is derived from the equation $$K = \frac{t_c - t_2}{t_3 - t_2}$$

and said predetermined distance d is derived from the equation $$d = \frac{v_a \cos\theta_3 \dfrac{\Delta f_{32}}{f_2}}{\dfrac{\dot{P}(t_3)}{P(t_3)} - \dfrac{\cos\theta_3}{\cos\theta_2} \cdot \dfrac{\dot{P}(t_2)}{P(t_2)}}$$

wherein $v_a$ is the sound velocity and $f_o \simeq f_2$.

5. An acoustic amplitude-doppler system as defined in claim 4 wherein the interval ratio value K is equal to 1.3660.

6. An acoustic amplitude-doppler system as defined in claim 4 wherein the interval ratio value K is equal to 1.3285.

7. An acoustic amplitude-doppler system as defined in claim 3 wherein said differentiating circuit comprises a first differentiating operational amplifier receiving said input signal P, a second differentiating operational amplifier receiving the output $\dot{P}$ of said first differentiating operational amplifier, and a third differentiating operational amplifier receiving the output $\ddot{P}$ of said second differentiating operational amplifier, said time determining circuit comprises a first zero crossing detector receiving the output $\dddot{P}$ of said third differentiating operational amplifier, a second zero crossing detector receiving the output $\ddot{P}$ of said second differentiating operational amplifier, and an up-down counter means receiving the outputs of said first and second zero crossing detectors and outputting the predicted time of arrival response $t_c$, and said distance determining circuit comprises a first divider circuit receiving said input signal P and said first derivative signal $\dot{P}$, first and second sample and hold circuits receiving the output $\dot{P}/P$ of said first divider circuit, a first subtractor circuit receiving the outputs of said first and second sample and hold circuits, filter means receiving said signal having a frequency $f_o$, third and fourth sample and hold circuits receiving the output of said filter means, a second subtractor circuit receiving the outputs of said third and fourth sample and hold circuits, a second divider circuit receiving the output of said fourth sample and hold circuit and the output of said second subtractor circuit, and a third divider circuit receiving the output of said second divider circuit and the output of said first subtractor circuit and outputting a response indicating the predicted distance d.

* * * * *